United States Patent [19]

Busby et al.

[11] 4,254,463

[45] Mar. 3, 1981

[54] DATA PROCESSING SYSTEM WITH ADDRESS TRANSLATION

[75] Inventors: W. Ray Busby; Von R. Dunn, both of Richardson, Tex.

[73] Assignee: Rockwell International Corporation, El Segundo, Calif.

[21] Appl. No.: 969,639

[22] Filed: Dec. 14, 1978

[51] Int. Cl.³ .......................... G06F 3/00; G06F 9/36
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,226,692 | 12/1965 | Fuller et al. | 364/200 |
| 3,675,215 | 7/1972 | Arnold et al. | 364/200 |
| 3,720,920 | 3/1973 | Watson et al. | 364/200 |
| 3,723,976 | 5/1973 | Alvarez et al. | 364/200 |
| 3,761,881 | 9/1973 | Anderson et al. | 364/200 |
| 3,854,126 | 12/1974 | Gray et al. | 364/200 |
| 3,949,380 | 4/1976 | Barbour et al. | 364/200 |
| 3,983,537 | 9/1976 | Parsons et al. | 364/200 |
| 4,025,901 | 5/1977 | Bachman et al. | 364/200 |
| 4,045,781 | 8/1977 | Levy et al. | 364/200 |
| 4,084,230 | 4/1978 | Matick | 364/200 |

OTHER PUBLICATIONS

Boggs, Jr., IBM Tech. Disc. Bull., "Virtual Input/Output Channels for a Digital Computer", vol. 20, No. 1, Jun., 1977, 110–112.
Olbert, IBM Tech. Disc. Bull., "Single Level Address Translation", vol. 20, No. 1, Jun., 1977, pp. 108–109.

*Primary Examiner*—Mark E. Nusbaum
*Assistant Examiner*—Eddie P. Chan
*Attorney, Agent, or Firm*—V. Lawrence Sewell; Howard R. Greenberg; H. Fredrick Hamann

[57] ABSTRACT

A data processing system is disclosed in which memory modules are connected at ports of interconnecting buses, with the physical addresses of the modules not necessarily being contiguous. The system includes a random access memory for translating contiguous logical memory addresses, as generated by a processor, to the physical addresses of the memory modules. The operation of the random access memory is such that memory modules of various sizes can be used together. Switching is provided for selectively interchanging word address bits and module address bits before the transformation is performed by the random access memory, thereby providing interleaving.

9 Claims, 6 Drawing Figures

|  | RAM INPUT BIT | | | | | INTER-LEAVING | MUX 58 OUTPUT | |
|---|---|---|---|---|---|---|---|---|
|  | 5 | 4 | 3 | 2 | 1 | | | |
| LOGICAL ADDRESS BITS | 21 | 20 | 19 | 18 | 17 | NONE | 3 | 2 |
| | 21 | 20 | 19 | 18 | 2 | TWO WAY | 3 | 17 |
| | 21 | 20 | 19 | 3 | 2 | FOUR WAY | 18 | 17 |

FIG. 3

FOUR WAY INTERLEAVING BY BIT SWAPPING

FOUR WAY INTERLEAVING BY BIT SHIFTING

A1  000 10 ... 000   ⟶   0000010 ... 0 A3

B1  000 10 ... 001   ⟶   0000110 ... 0 B3

C1  000 10 ... 010   ⟶   0001010 ... 0 C3

D1  000 10 ... 011   ⟶   0001110 ... 0 D3

E1  000 10 ... 100   ⟶   0000010 ... 1 E3

DATA PROCESSING SYSTEM WITH ADDRESS TRANSLATION

BACKGROUND OF THE INVENTION

This invention relates to an apparatus by which elements of a computer can address memory modules, including modules having discontiguous physical addresses, and modules of various sizes, and including the use of interleaving.

In one form of computer architecture, the main memory is formed of multiple memory modules connected at ports of an interconnecting bus, with the possibility of multiple buses, as well. To access a particular data word or byte in memory, it is necessary to provide a physical memory address which includes the address of the bus, the address of the port at which the memory module is connected, and the address of an individual word or byte in a memory module. Conventionally, starting with the lowest memory address, the memory modules are connected at ports of increasingly higher addresses on one bus, and then on buses with increasingly higher addresses, so that there are no unfilled physical memory addresses smaller than the largest occupied physical address in the memory.

Thus, conventionally, the physical addresses of the memory modules are contiguous, increasing in an unbroken sequence from the beginning of memory to the end. This is compatible with logical memory addresses generated by other elements of the computer such as the central processing unit. These logical addresses are likewise contiguous and increase from some starting value to a final value, without any gaps. In such a case, the logical addresses generated by a processing unit or peripheral unit are the same as the physical memory addresses and are used to address words or bytes in the several memory modules.

With respect to the present invention, it was conceived that it would be advantageous if memory modules could be placed at various ports on different interconnecting buses, without being restricted to contiguous physical memory addresses. This is particularly applicable to computer systems wherein the central processing unit, main memory and peripheral units are all connected to ports of the same buses. In the latter type of system, it would be possible, for example, to arrange the elements of a computer in hardware cabinets each of which has a single bus associated with it. A first cabinet might include a processing unit and peripheral devices, so that the bus could not hold a full complement of memory modules. Additional memory modules for the system could be placed in a second cabinet on a second bus, if it were not necessary to maintain contiguous addresses.

The conceived use of a memory with discontiguous physical addresses poses problems. The basic problem is that the software and the processing unit generate contiguous logical addresses, as described above. Moreover, it is desirable to provide a memory operation that allows interleaving, that is, permitting words with adjacent logical addresses to be stored in different memory modules so that access to a second word can be begun before access to a first word is completed. Additionally, there would be an advantage in allowing memory modules of different sizes (capacities) to be installed at the various ports. Presumably, software methods could be devised to achieve some of these objectives; however, they would be unacceptably slow and difficult to manage.

Therefore, it is an object of the invention to permit operation with memory elements having discontiguous physical addresss.

Another object is to provide such operation, along with interleaving capability.

Yet another object is to permit operation with discontiguous physical memory addresses and incorporating memory modules of various capacities.

SUMMARY OF THE INVENTION

In accordance with the present invention, there is provided a data processing system in which memory modules are connected at ports of interconnecting buses, with the physical addresses of the modules not necessarily being contiguous. A processor, connected to one of the bus ports, generates a sequence of contiguous logical memory addresses. The system includes a translation apparatus for transforming any of the logical addresses to a corresponding one of the physical memory addresses, so that the processor can properly access memory, despite the discontiguous physical memory addresses. In a preferred embodiment, the system includes means for selectively changing bits in a logical address before it is applied to the translation apparatus, so as to provide interleaving. Likewise, in a preferred embodiment, the translation apparatus is configured to permit the installation of memory modules of various sizes at the ports of the interconnecting buses.

By the operation of the present invention, memory modules may be installed so as to have discontiguous physical addresses. Yet accessing units such as a central processing unit, can address them with addresses in a contiguous sequence. Interleaving is possible despite the existence of the non-adjacent physical addresses. Moreover, the translation apparatus can be set up to make optimal use of memory modules of various sizes at ports on a plurality of buses.

BRIEF DESCRIPTION OF THE DRAWINGS

FIG. 3 is a chart showing bit swapping used in the system of the invention to achieve interleaving.

FIG. 4 lists addresses illustrating interleaving by bit swapping.

DESCRIPTION OF THE PREFERRED EMBODIMENT

Figure 1:
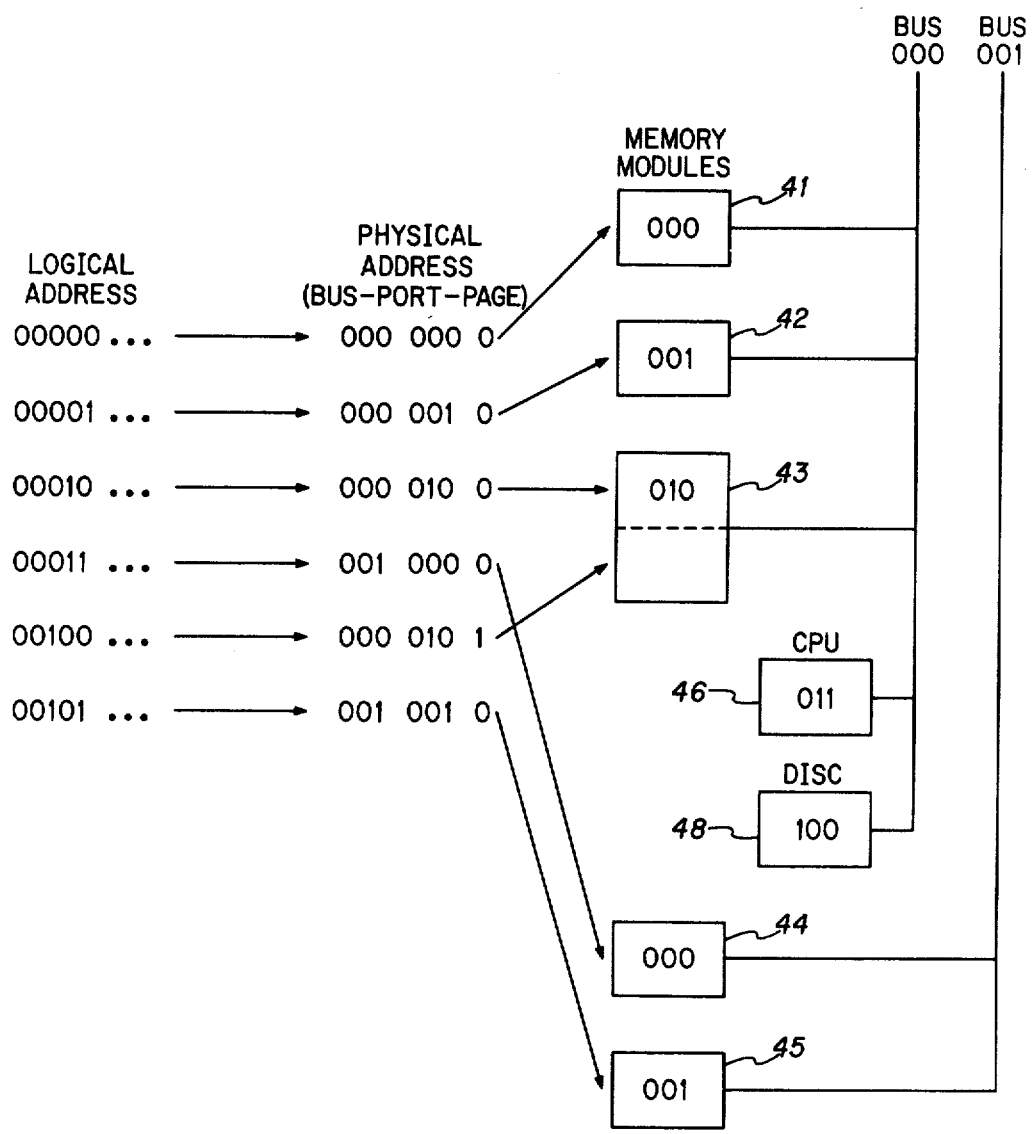
FIG. 1 is a block diagram of a system having memory modules, interconnected with discontiguous physical addresses, along with the memory translation required to properly address the modules.

FIG. 1 shows an example configuration of a computer memory formed by memory modules 41–45. Modules 41–43 are each connected to one port of a bus 000. Module 43 has twice the size or storage capacity as each of modules 41 and 42. Therefore, module 43 can be divided into two pages (as indicated by a dashed line), each the size of one of the modules 41 and 42. However, the two pages of module 43 cannot be accessed at the same time, because there is not a separate port to each page. Modules 44 and 45, the same size as modules 41 and 42 are each on a separate bus 001. A central processing unit 46 and a magnetic disc memory 48 are connected at ports 011 and 100, respectively, illustrating that other units may be interposed between memory modules.

Also seen in FIG. 1 is a column of bus-port-page portions of physical addressses used to access modules 41–45. Arrows indicate the module which is associated with each physical address. By way of example, consider the next-to-last address in the list, which has an arrow pointing to the second page of module 43. The first three bits of the address are 000 corresponding to the bus 000 on which module 43 is located. The next three bits 010 are the address of the port to which module 43 is connected. The last bit, a "1" corresponds to the second page of module 43. In accessing an individual word or byte, the bus-port-page address bits are followed by bits addressing the particular word or byte on the indicated module. When the full address is entered into an appropriate register, a particular word or byte of memory in the selected module is addressed for fetching or storing a number at the selected memory location.

As indicated above, the second page of module 43 is not addressable at the same time as the first page; the page address bit is simply the highest order bit of a word address for the module. That is, the words on the second page of module 43 have a 1 as the highest order bit, while those on the first page have a 0 as the highest order bit.

The "LOGICAL ADDRESS" list shows the higher order bits of the kinds of addresses which are ordinarily generated by a processor such as a central processing unit in a computer. The higher bits shown correspond to memory modules and pages, while the parts indicated by ellipsis would correspond to word or byte addresses in a module. Arrows in the figure connect each logical address with a corresponding bus-port-page address of the module which the logical address seeks to access.

The overall problem confronted by the invention can be seen by comparing each logical address in FIG. 1 with its corresponding bus-port-page address. For the first three logical addresses, the five higher order bits of the logical address are the same as the five lower order bits of the bus-port part (that is, excluding the page bit) of the physical address. In the last three cases, however, the five higher order bits of the logical address and the five lower order bits of the bus-port address are different. In the last three logical addresses, the five higher bits correspond to the lower order bits of bus-port addresses 000 011, 000 100 and 000 101. The latter are the physical addresses of ports 011–101 on bus 000, which ports are not occupied by memory modules. Thus, if the five higher order bits of all the logical addresses were used as bus-port addresses, some unoccupied ports would be accessed.

A second problem occurs when it is attempted to provide the system with interleaving. Interleaving means that two adjacent logical addresses generated by a processor are not in adjacent physical memory addresses, but in two different modules of memory which can be accessed at the same time. For example, if two elements of a data list are stored in modules 41 and 42 of FIG. 1, then access to the data in module 42 can be begun before access to data in module 41 is complete, with savings in computation time.

A way of achieving interleaving is to make an exchange in the logical address between the lowest order bit in the word address and the lowest order bit in the port address. When this is done, an increment of 1 in the logical address causes access to an adjacent module rather than to an adjacent word. However, with a configuration like FIG. 1 it would be necessary to have an even number of buses and to have each bus provided with its full complement of modules. Otherwise, during interleaved operation, logical addresses would occur for which the corresponding physical address was not occupied by a memory module. With respect to the present invention, it is considered important to be able to have an odd number of buses, which are not necessarily full of memory modules.

A third problem arises if modules of various sizes such as modules 43 and 42 are used together. This presents problems of correspondence between logical addresses and physical memory addresses. It also creates special situations with respect to optimal implementation of interleaving, which will be discussed further, hereinafter.

Figure 2:
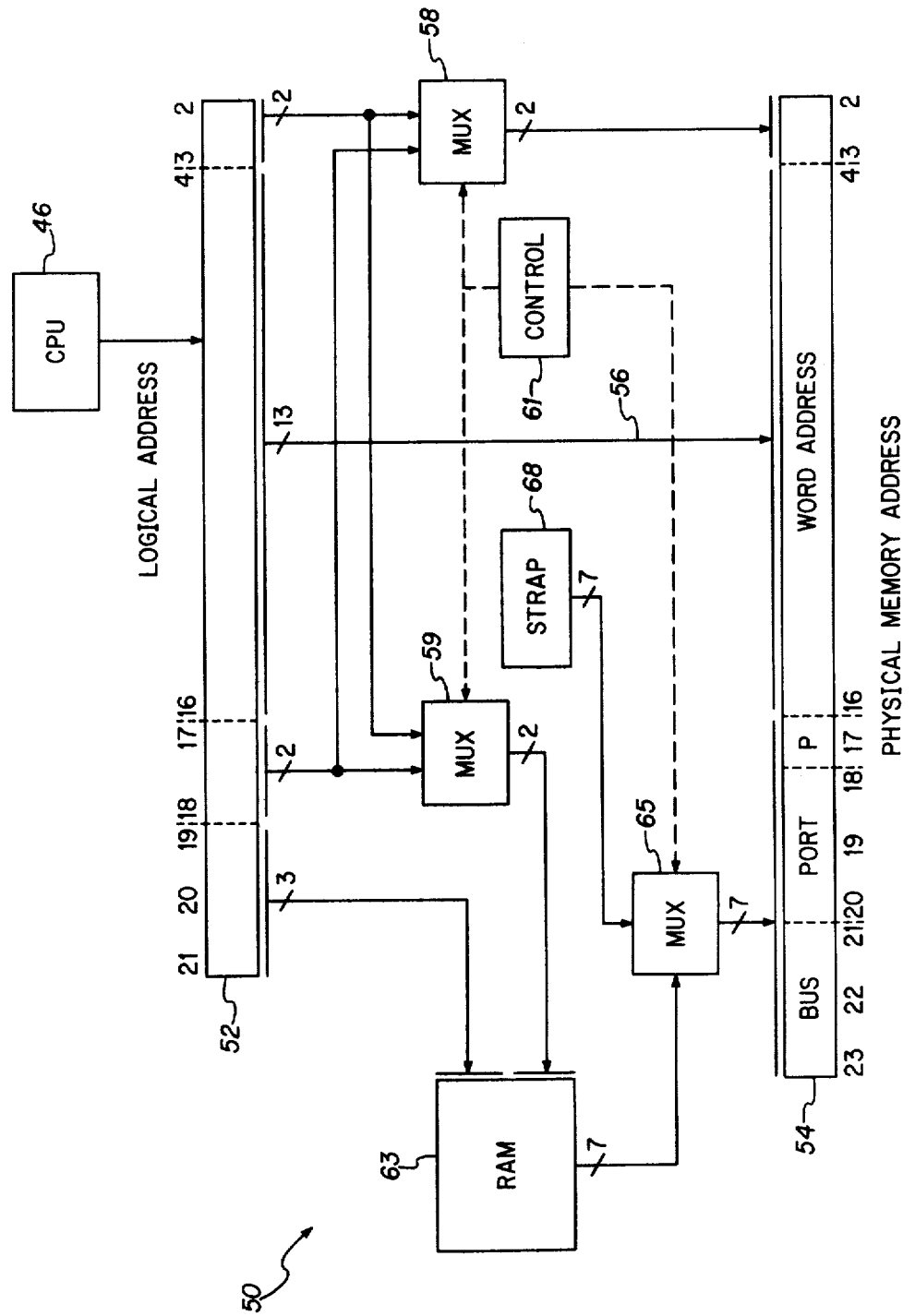
FIG. 2 is a block diagram of the address translation apparatus of a system according to the invention.

FIG. 2 shows a memory translation apparatus conceived to deal with all of the problems discussed in connection with FIG. 1. The apparatus is indicated generally by the reference numeral 50. A logical address generated, for example, by a processing unit 46, is held in a register 52. As shown in the drawing by numbers associated with register 52, the address in this example is a twenty bit address. Bits number 0 and 1 are not included in the drawing; they are byte selection bits, which can be handled differently, not participating in the address translation.

The output of translation apparatus 50 is a register 54. As indicated by arrow 56, thirteen bits are transferred directly from bit locations 4–16 of register 52 to bit locations 4–16 of register 54. Bits 2 and 3 of register 52 are applied to the inputs of multiplexers 58 and 59. Likewise, bits 17 and 18 of register 52 are applied to the inputs of the two multiplexers. Bits in a control register 61 determine which of the four bits available at the input of multiplexer 58 are output by the multiplexer to bit positions 2 and 3 of register 54. Similarly, under the control of register 61, multiplexer 59 outputs two of the four bits at its input to random access memory 63. Also applied to random access memoory 63 are bits 19–21 of register 52.

The five bits input to random access memory 63 constitute an address in memory 63 and cause the contents of that address to be output by memory 63. The output of memory 63 is to multiplexer 65. The other input to multiplexer 65 is from strap inputs 68. Ordinarily, control register 61 switches multiplexer 65 to apply the memory 63 output to register 54. The strap inputs 68 are used after a power down, as will be described below.

Random access memory 63 contains, in this embodiment, thirty two 8-bit words. The seven lower order bits of the words contain the bus-port-page addresses, as illustrated in FIG. 1. The high order bit of each word in memory 63 can be used, for example, as a parity/access enable bit. Thus, a word size in excess of the size required (seven bits, in this embodiment) for the bus-port-page address provides bits which can be used for other functions. The memoory unit 63 will be referred to herein as a random access memory, and can be a semiconductor or core memory or the equivalent. In can also be a read-only memoory. The five bits input to memory 63 from register 52 and multiplexer 59 constitute the five higher order bits of logical addresses, in the absence of interleaving. Thus, the higher order bits of the logical addresses are used to address memory locations in random access memory 63. In the memory location accessed by the five bit logical address is the bus-port-page physical memory address associated with the logical address. Thus, for the example of FIG. 1, location 00011 in memory 63 contains the parity/access enable bit plus 001000, corresponding to memory module 44. Therefore, when 00011 is input to random access memory 63, the bus-port-page address corresponding to memory module 44 is output by memory 63 to bits 17-23 of register 54.

When the contents of control register 61 are selected to cause non-interleaving operation, multiplexer 59 simply applies to random access memory 63 bits 17 and 18 from register 52. As a result, the five address bits input to memory 63 are bits 17-21 of register 52. For this condition, multiplexer 58 transfers bits 2 and 3 from register 52 to bits 2 and 3 of output register 54. Thus, for non-interleaving operation, bits 2-16 of register 54 are the same as bits 2-16 of register 52. Random access memory 63 causes bits 17-23 of output register 54 to receive the appropriate bus-port-page address corresponding to the bits 17-21 of the logical address in register 52. It is in this way the apparatus 50 translates the logical address from input register 52 to a corresponding physical memory address in output register 54, for the case of no interleaving.

By the contents of the locations of random access memory 63, the apparatus 50 deals with the problem of memory modules of various sizes. Thus, in FIG. 1 modules 41, 42, 44 and 45 each have one logical address associated therewith; module 43 has two logical addresses, 00010 ... and 00100 ... associated with it. The fact that the two logical addresses corresponding to module 43 are not contiguous is related to interleaving and will be discussed below.

Address translation apparatus 50 makes it immaterial to a processing unit or peripheral unit which is generating logical addresses at register 52 that the two pages of memory on module 43 are located on one module, rather than two separate modules. It should be apparent to one skilled in the art, that a random access memory capable of delivering additional page bits would permit the use of modules even larger than module 43.

Interleaving operation in apparatus 50 can be understood with reference to FIGS. 2 and 3. In FIG. 3, the row containing a "NONE" under "INTERLEAVING" corresponds to operation without interleaving. The contents of that row indicate that bits 1-5 of the input to random access memory 63 are bits 17-21 of the logical address in register 52. This means, as described earlier, that multiplexer 59 presents at its output bits 17 and 18 from register 52. Also, as previously described for the case of no interleaving, FIG. 3 shows multiplexer 58 outputting bits 2 and 3 from register 52.

For the simplest interleaving, two-way interleaving multiplexer 59 outputs bits 18 and 2 of register 52, while multiplexer 58 outputs bits 3 and 17 of register 52. As can be seen in FIG. 3, two-way interleaving essentially swaps bits 2 and 17. Thus, for example, if bits 17-21 of register 52 were 00010, a logical address having a "0" in bit 2 would result in 00010 being applied to random access memory 63. On the other hand, the logical address of the next word, which would end with a "1", would result in 00011 being applied to memory 63. As a result, for two words with adjacent logical addressses, one would be stored in the first page of module 43 in the system of FIG. 1, while the next would be stored in module 44. If one of these words is to be processed next after the other, the processing of the one can be initiated before processing of the other is completed, because each word can be accessed through a different memory port.

In four-way interleaving, multiplexer 59 outputs bits 2 and 3 from register 52, while multiplexer 58 outputs bits 17 and 18 from register 52. Thus, bits 2 and 17 are swapped, and bits 3 and 18 are also interchanged. FIG. 4 shows an example of four-way interleaving by the bit swapping described. Each of the contiguous logical addresses A1-E1 on the left is translated into a logical address A2-E2 on the right. The five high order bits of the addresses A2-E2 are then input to random access memory 63, directing each of the words A2-D2 to a different memory module. The system of FIG. 1 is not suitable for four-way interleaving, because the total number of pages or memory modules is 6, which is not evenly divisible by four. Because of this, four-way interleaving would sometimes generate logical addresses, for which there is no corresponding physical memory address. However, it is instructive to consider that the addresses A2-D2 generated by four-way interleaving in FIG. 4 would be stored in modules 41, 42, 43 and 44, respectively, using the swapping shown in FIG. 4.

If higher order interleaving is required, the multiplexers 58 and 59 can be made larger to allow swapping selected ones of bits 19-21 of register 52 with bits 4-6 of that register.

The memory translation apparatus 50 effectively deals with interleaving which includes multiple pages on a module such as module 43. As illustrated in FIG. 1, logical addresses 00010 ... and 00011 ... can be mapped (through random access memory 63) onto the first page of module 43 and onto module 44, respectively. In light of the examples given, it can be understood that with two-way interleaving, two words with adjacent logical addresses might be directed toward modules with addresses 00010 ... and 00011 .... Since module 43 and module 44 are on two separate ports, this would provide satisfactory interleaving operation. Likewise, the logical addresses 00011 ... and 00100 ..., mapped onto module 44 and onto the second page of module 43, respectively, form satisfactory pairs for two-way interleaving. It would not be suitable to have the two pages of module 43 correspond to successive addresses in the logical address column in FIG. 1, because only one port serves both pages.

If memory unit 63 is a volatile memory, then when the apparatus 50 experiences a loss of power and is subsequently powered up, the contents of random access memory 63 are unpredictable and must be reestablished. This can be accomplished in the following way. Control register 61 is set so as to disable both interleaving and translation. Multiplexer 58 is switched by the controls so as to pass bits 2 and 3 from register 52 to register 54. Multiplexer 65 is switched by a control 61 so that seven bits from strap inputs 68 are input to bits 17-23 of register 54. The strap inputs 68 are, for example, wired logic levels, predictable after a power down and power up.

Processor 46 can then read a bootstrap record from, say, disc unit 48, into a selected one of the memory modules 41-45. The selected module is established by the seven bit bus-port-page address provided by strap inputs 68. Next, processor 46 loads random access memory 63 from a memory configuration map in the bootstrap record (stored in the selected memory module). At this point, it is possible to enable translation, by control register 61, switching multiplexer 65 so as to pass the output of random access memory 63 to register 54. Also at this point, interleaving can be enabled by control 61. If interleaving is specified, the bootstrap record is again read, this time into interleaved memory.

As an alternative to the use of strap inputs 68 at start up, processor 46 can load one word of random access memory 63 with mapping bits corresponding, for example, to port 000 on bus 000. Then the processor can attempt to read a word from a memory module which might be at that port. If the read is successfully performed, the processor can proceed with transferring the memory map from a bulk storage device to the module at the tested port and thence to RAM 63. If the read is unsuccessful, indicating that the first port tried is not occupied by a module (which is in working order), then the processor can load RAM 63 with a code for mapping to, say, bus 000, port 001, and attempt another read. In this manner, the processor can sequentially test the bus ports until it finds a memory module for use in its bootstrapping operation. This has an advantage over the use of strap input 68, in that startup would not be spoiled by the failure of the single memory module to which the strap inputs point.

Figures 5, 6:
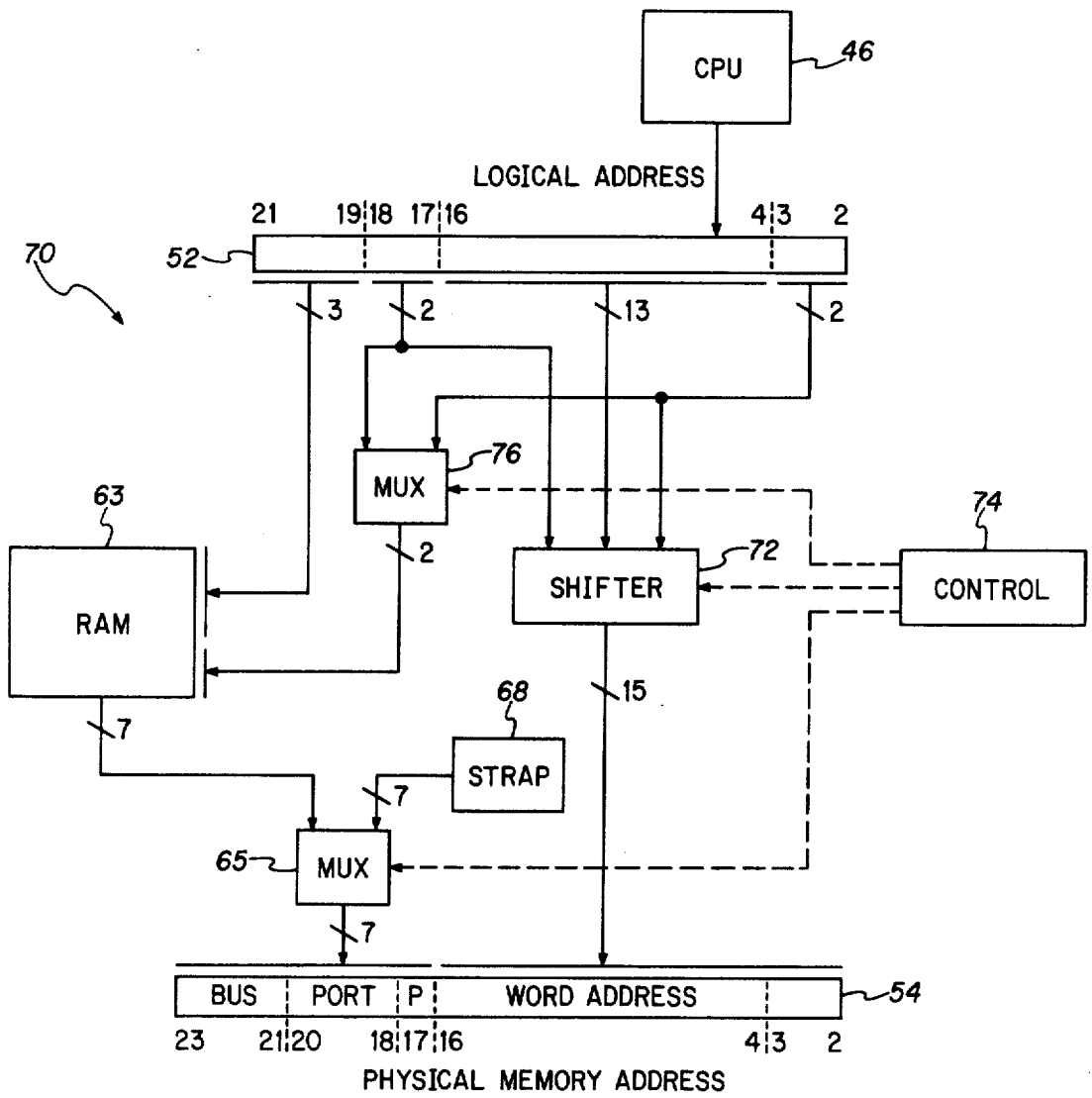
FIG. 5 is a block diagram of an embodiment of the invention employing bit shifting to produce interleaving.
FIG. 6 lists addresses illustrating interleaving by bit shifting.

FIG. 5 shows a memory address translation apparatus 70 which includes an alternate embodiment of interleaving. In the apparatus 70, interleaving is performed by shifting rather than bit swapping. The operations are carried out by a shifter 72 which can be implemented, for example, by using four four-bit shifters interconnected in a manner which will be apparent to one skilled in the art from a description of the required operation. Suitable shifters are the model AM25S10, made by Advanced Micro Devices. Shifter 72 has as inputs bits 2-18 of register 52, and it outputs fifteen bits to bits 2-16 of output register 54.

For no interleaving, control 74 commands shifter 72 to simply pass bits 2-16 of the logical address in register 52 into bits 2-16 of output register 54. Bits 17 and 18 of register 52 are applied to RAM 63. For two-way interleaving, a code is received from control 74 that causes shifter 72 to enter bits 3-17 of register 52 into bits 2-16 of output register 54. At the same time, multiplexer 76 is commanded by control 74 to input bits 2 and 18 of register 52 to RAM 63 instead of bits 17 and 18. The results of such a shifting will be discussed with respect to FIG. 6. For four-way interleaving, shifter 72 is commanded to apply bits 4-18 from input register 52 to bits 2-16 of output register 54. In this case, multiplexer 76 applied bits 2 and 3 of register 52 to RAM 63 instead of bits 17 and 18.

FIG. 6 shows an example of four-way interleaving produced by shifting in apparatus 70. The addresses in FIG. 6 are all logical addresses. A1-E1 are addresses that would appear in register 52. Addresses A3-E3 represent the bits output by shifter 72 along with those bits input to RAM 63.

Addresses A1-E1 are sequential addresses, and since the higher order bits are the same, they would all be mapped by RAM 63 into a signle memory module. After the shifting operation of apparatus 70 to produce four-way interleaving, the four addresses A3-D3 have different higher order bits which would map them all into different memory modules. It is particularly noteworthy that the addresses A3 and E3 are sequential, so that they would be located in adjacent locations in physical memory after interleaving. By contrast, the addresses A2 and E2 in FIG. 4 have addresses which would map into the same memory module, but not into adjacent word addresses. Thus, interleaving by shifting produces a mapping which is somewhat simpler than that produced by bit swapping.

By means of the operation described, memory translation apparatus 50 solves a number of problems presented by memory utilization of the type illustrated in FIG. 1. First, it allows contiguous logical addresses to access memory having discontiguous physical addresses. Additionally, interleaving is provided in the presence of unfilled physical memory locations on a bus and nonsymmetrical location of modules on multiple buses. The present invention further teaches how to use a memory having modules of various sizes intermingled and, indeed, how to provide proper interleaving with respect to pages of a larger, partitioned module.

Although preferred embodiments of the invention have been described in detail, it is to be understood that various changes, substitutions and alternations can be made therein, without departing from the spirit and scope of the invention as defined by the appended claims.

What is claimed is:

1. In a data processing system including at least one interconnecting bus, means for generating a sequence of contiguous logical memory addresses for said bus, and a plurality of memory modules, connected at ports on said bus and having physical memory addresses associated therewith, with said modules being connectable so that the physical addresses thereof are not necessarily contiguous, an improved transformation unit comprising:

an input register, having a first field of bits and second field of higher order, module address bits, for receiving any of said logical memory addresses;

an output register having a third field of bits and a fourth field of higher order bits, for providing one of said physical memory addresses;

transforming means, upon selection of non-interleaving operation, for receiving at an input thereof bits of a logical memory address, from the second field of the input register, and generating bits of portion of the a corresponding physical memory address to the fourth field of the output register and means for transferring bits from the first field of the input register to the third field of the output register to form another portion of the corresponding physical memory address;

means, upon selection of interleaving, for directing sequential logical memory addresses to separate memory modules in accordance with interleaving, including means for applying a selected number of bits from the first field of the input register to said input of said transforming means in the place of a part of said module address bits from said second field for generating bits of a portion of the corresponding physical memory address to the fourth field of the output register and means upon selection of interleaving, transferring selected bits of said first and second field to said third field to form another portion of the corresponding physical memory address.

2. The system of claim 1, wherein said transforming means includes means for providing correspondence between pages of a module and noncontiguous logical memory addresses, whereby said pages can be interleaved with memory in other modules.

3. The system of claim 1, wherein said transforming means includes means for generating bits of said corresponding physical memory address when said modules are of a plurality of memory capacities.

4. The system of claim 1, wherein said transforming means includes a transforming memory unit addressable by a portion of said logical address to generate a portion of the corresponding physical address.

5. The system of claim 4, wherein said transforming memory unit stores address data which become unpredictable upon a loss of power, and said system includes additional means for transforming logical addresses to physical memory addresses for at least one of said modules in a manner predictable after a loss of power.

6. The system of claim 5 further including means for writing into said at least one memory module said portions of said physical addresses and then after a loss of power writing said portions of said physical addresses from said at least one module into said transforming memory unit.

7. The system of claim 1, wherein at least one of said memory modules is larger than another of said modules and includes a plurality of pages, and wherein said bits entered by said unit in the output register include at least one bit for separately addressing said pages, thereby to permit interleaving said pages with memory on other modules.

8. The system of claim 1, wherein said means for transferring bits of said second field to said third field includes means for substituting the bits transferred from the second field for the bits which are applied from the first field to the input of the transforming means.

9. The system of claim 1, wherein said means for transferring bits of said first and second fields to said third field includes means for shifting bits of the first and second fields toward lower order positions in the third field than the shifted bits occupied in the first and second fields.

* * * * *

UNITED STATES PATENT AND TRADEMARK OFFICE
CERTIFICATE OF CORRECTION

PATENT NO. : 4,254,463

DATED : 3/03/81

INVENTOR(S) : Busby, W. Ray and Dunn, Von R.

It is certified that error appears in the above-identified patent and that said Letters Patent are hereby corrected as shown below:

IN THE SPECIFICATION

Column 2, line 5, delete "addresss" and substitute therefor -- addresses --

Column 4, line 64, delete "memoory" and substitute therefor --memory--.

line 67, delete "memoory" and substitute therefor --memory--.

Column 5, line 9, delete "001000" and substitute therefor --0010000--.

Column 7, line 63, delete "signle" and substitute therefor --single--.

Column 8, line 45, after "of" second occurrence, insert --a--.

line 46, delete "a".

UNITED STATES PATENT AND TRADEMARK OFFICE
CERTIFICATE OF CORRECTION

PATENT NO. : 4,254,463
DATED : 3/03/81
INVENTOR(S) : Busby, W. Ray and Dunn, Von R.

It is certified that error appears in the above–identified patent and that said Letters Patent are hereby corrected as shown below:

Column 9, line 13, delete "system" and substitute therefor --transformation unit--.

Signed and Sealed this

*Fifteenth* Day of *September 1981*

[SEAL]

*Attest:*

*Attesting Officer*

GERALD J. MOSSINGHOFF

*Commissioner of Patents and Trademarks*